United States Patent

[11] 3,608,034

| [72] | Inventors | Anthony Bramley<br>Gosford, Kidlington, Oxford;<br>John F. Gilbert, Chalford, both of England |
| --- | --- | --- |
| [21] | Appl. No. | 879,424 |
| [22] | Filed | Nov. 24, 1969 |
| [23] | | Division of Ser. No. 458,591, May 25, 1965,<br>Pat. No. 3,501,366 |
| [45] | Patented | Sept. 21, 1971 |
| [73] | Assignee | said Bramley, by said Gilbert |
| [32] | Priority | May 29, 1964 |
| [33] | | Great Britain |
| [31] | | 22379/64 |

[54] PRODUCTION OF NETTING
3 Claims, 8 Drawing Figs.

[52] U.S. Cl. .................................................. 264/145,
161/56, 264/167, 264/251
[51] Int. Cl. ...................................................... B29d 3/00,
B29h 9/00, D01d 5/20

[50] Field of Search ........................................ 264/DIG.
81, DIG. 70, 251, 263, 149, 151, 328, 138, 145,
167, 146; 161/DIG. 6, 56–59

[56] References Cited
UNITED STATES PATENTS

| 2,669,770 | 2/1954 | Brewer ......................... | 264/251 |
| 2,920,354 | 1/1960 | Zumbrunnen ................ | 264/251 |

Primary Examiner—Robert F. White
Assistant Examiner—Jeffery R. Thurlow
Attorney—Woodhams, Blanchard and Flynn ABSTRACT: A method for producing netting is disclosed wherein a first plurality of flexible threads of plastic material are positioned in spaced parallel relationship. A second plurality of spaced, parallel and flexible threads extend transversely across the first threads. A plurality of small masses of plastic material are individually molded about the intersections of the two pluralities of threads and welded to the plastic material of each thread. Portions of some of the longitudinal threads are preferably electrically conductive and have exposed conductive surfaces to permit the netting to be used for electrified fencing.

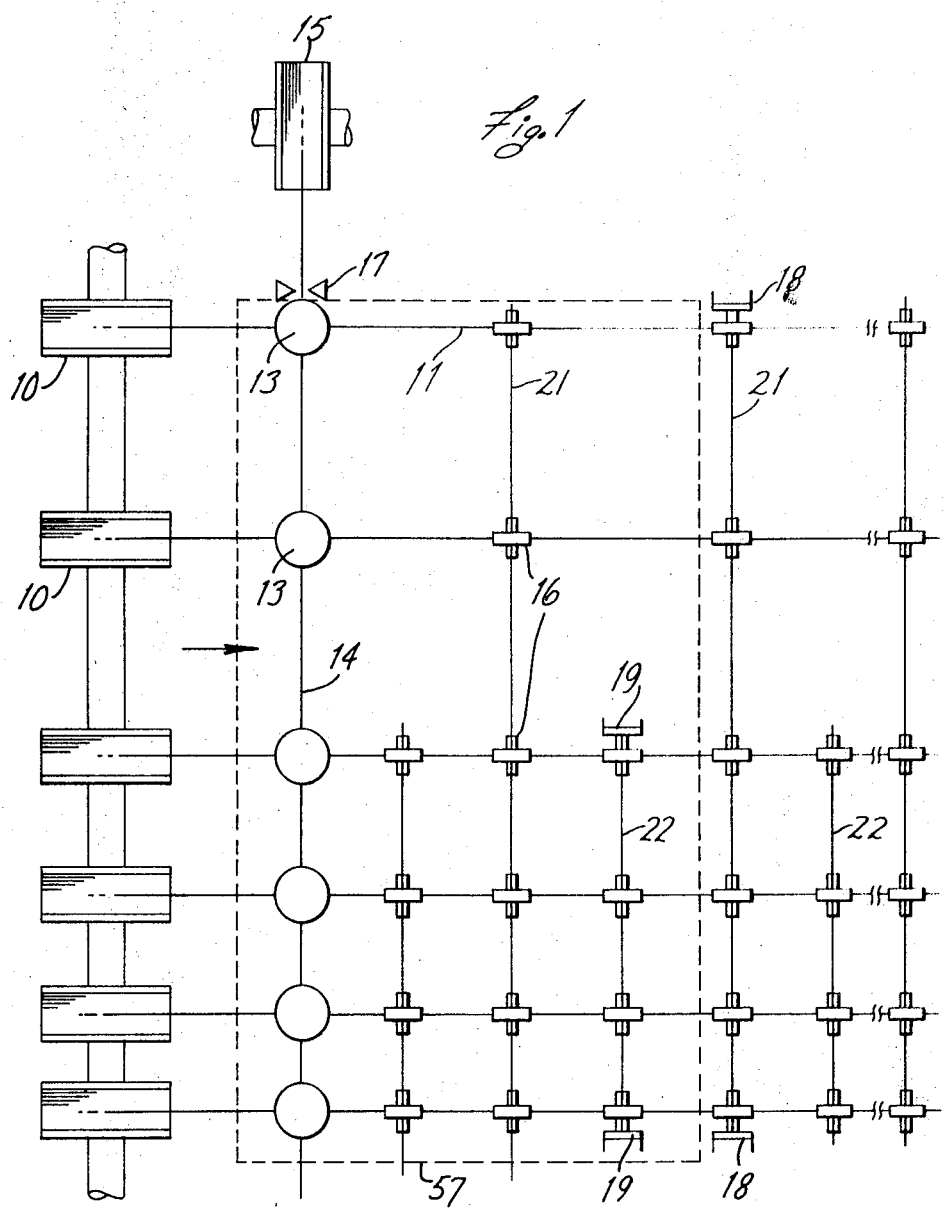

PATENTED SEP 21 1971 3,608,034
SHEET 2 OF 3
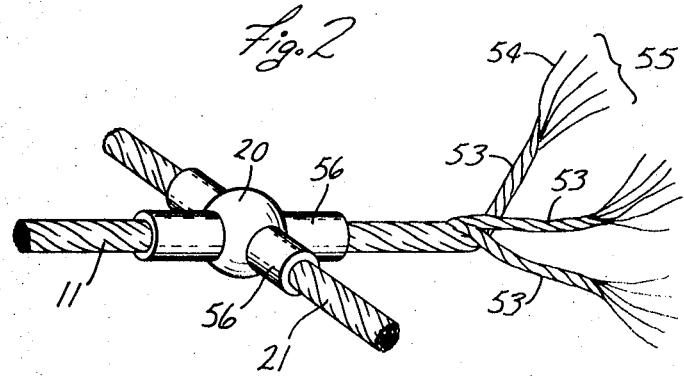
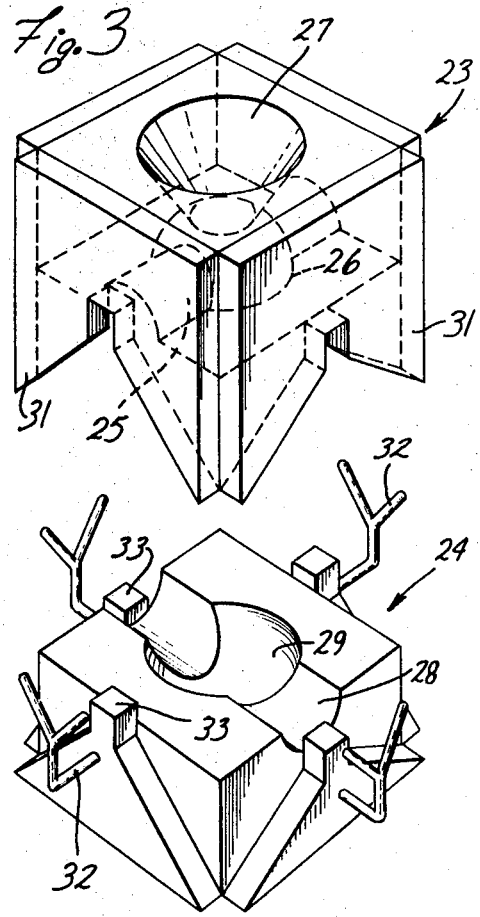
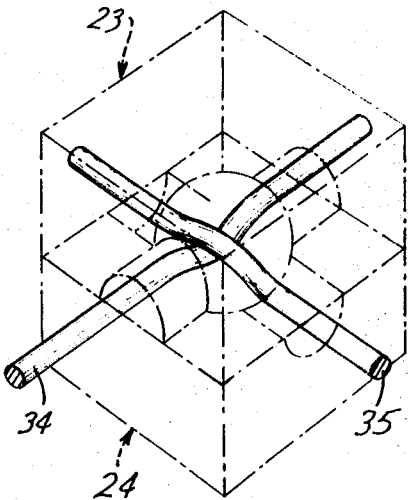
INVENTORS
ANTHONY BRAMLEY
JOHN F. GILBERT
BY
Woodhams Blanchard & Flynn
ATTORNEYS

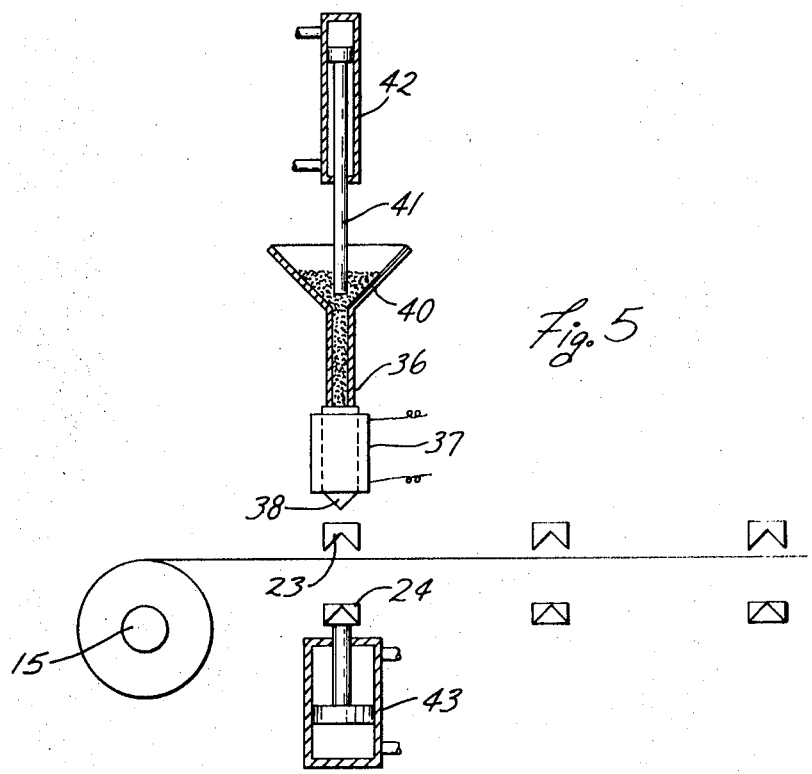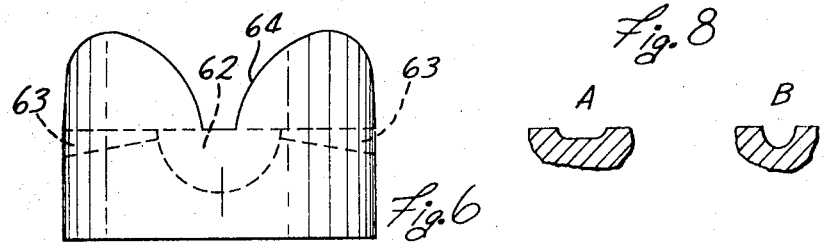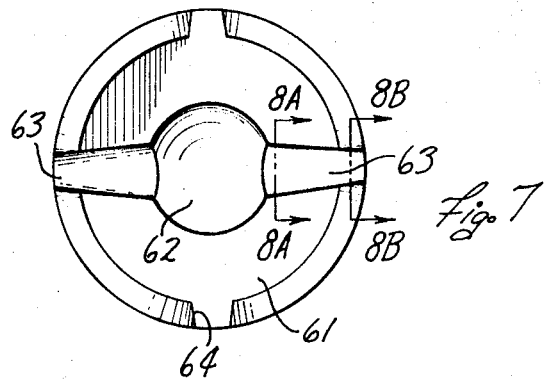

PRODUCTION OF NETTING

CROSS-REFERENCE TO RELATED APPLICATION

This application is a voluntary divisional of Applicants' copending application Ser. No. 458,591, filed May 25, 1965, now Pat. No. 3,501,366, entitled "PRODUCTION OF NETTING."

The present invention relates to the production of netting and provides a method for such production.

In making nets by the conventional method, the constituent threads or strands are knotted together in the net making machine or by hand. The present invention provides a new process which produces netting having different or improved properties as compared with netting made in the conventional way.

The netting according to the invention comprises a plurality of spaced, longitudinally extending, flexible threads and a plurality of spaced transverse, flexible threads interconnecting the longitudinal threads and secured thereto where they cross the same by a small mass of plastics material. It is preferred that at the crossing of a longitudinal and a transverse thread one or both of the threads deviates from a straight line in such a manner that the two threads bear against one another to lend strength to the bond between them.

The invention also provides a method of producing netting in which a plurality of flexible transverse threads are laid across a plurality of flexible longitudinal threads, a small mass of plastics material is applied to the threads at crossing points to secure the longitudinal to the transverse threads and the plastics mass is allowed to harden. The preferred resins are thermoplastic, and the small masses can then readily be applied under pressure in a heat-softened condition and hardened by cooling. A number of such small plastic masses can be applied simultaneously to a corresponding number of crossings.

The invention further provides apparatus for making netting by the foregoing method which comprises a mold cavity, means for introducing longitudinal and transverse thread into the cavity to cross therein and means for injecting a moldable plastics material into the cavity to form a plastics mass round the thread crossing. For continuous production, the apparatus includes multiple molding assemblies with multiple or separate dies, in which a number of plastic masses, preferably distributed across the whole width of the netting, can be formed simultaneously at respective thread crossings.

In the preferred form of the method according to the invention, a transverse thread is drawn across at least two spaced longitudinal threads, each crossing of a longitudinal thread and the transverse thread is enclosed in a die assembly, quantities of heated plastics material of a molding consistency are severally injected into the die assemblies to form a bond between the longitudinal and transverse threads and the bonded potions are removed from the die assemblies by longitudinal movement of the longitudinal threads, this cycle of operations being performed repeatedly along the length of the longitudinal threads.

It is preferable that either of, or advantageously both, the longitudinal and the transverse threads are bent or curved round the other at their crossing, as this adds strength to the bond as indicated above. This can be achieved by appropriate design of the die assemblies, and the manner in which the threads are inserted in the dies.

A lower limit is set to the working temperature by the necessity for the plastics material to be of a consistency suitable for molding or being injected into the die assemblies.

The method is especially suitable for use in the production of netting from threads which include thermoplastic material, for example polyethylene monofilaments or twine. In this case, injection of a thermoplastic material near the lower temperature limit forms a bond the strength of which is limited to the resistance offered to slipping of the threads, and is usually well below the breaking strain of the threads themselves.

Where thermoplastic thread materials are employed, an upper temperature limit also exists, being that at which the thermoplastic material of the threads melts within the die assembly. In this case also, the bond has a breaking strain lower than that of the thread itself. The optimum working temperature lies between these upper and lower limits, where the molded material welds to the threads without significant melting of the threads.

The preferred form of apparatus according to the invention comprises means for advancing a plurality of spaced, longitudinal threads, a plurality of injection molded die assemblies corresponding in number and disposition to the longitudinal threads, means for supplying transverse threads to the die assemblies, each die assembly being adapted to receive in each cycle of operation one longitudinal thread and a transverse thread crossing and extending between at least two longitudinal threads, and means for injecting heated thermoplastic material of a molding consistency into each die assembly to form a bond therein between the longitudinal and transverse threads, the die assemblies being openable for the removal of the bonded portions of the threads by the advancement of the longitudinal threads.

The longitudinal threads are preferably drawn intermittently through the die assemblies and the transverse thread drawn across the longitudinal threads in front of the die assemblies during the molding of plastic masses onto the crossings of the previously drawn transverse thread. The transverse thread is preferably supplied from a continuous length of transverse thread material and detached therefrom before its removal from the die assemblies, when bonding is complete.

The preferred form of die assembly includes two cooperating dies, movable with respect to each other, a die cavity formed within the two dies and portions at the edges of the cavity where the threads emerge which are shaped to engage tightly the threads emerging from the dies and prevent egress of plastics material during the molding operation.

The injection of plastics material is conveniently brought about by the use of a heated injector barrel through which granular material can be forced by means of a plunger and provided with a nozzle adapted to cooperate with a recess in one of the dies communicating with the moulding cavity. Alternatively, the injector barrel can be adapted to receive predetermined lengths of cut rod or pellets of a thermoplastic material corresponding in diameter to the internal diameter of the barrel, a further length or pellets being inserted after each injection stroke.

The netting according to the invention can be used for a variety of purposes for which conventionally made netting can be employed, depending on the material of the threads and their configuration. One important application is as fencing netting, and if the longitudinal and/or transverse threads include electrically conductive material the netting may be useful in the erection of electrified fences or enclosures.

For example, one form of netting for use in the erection of electrified enclosures comprises a plurality of longitudinal, flexible, electrically conductive threads having an exposed conductive surface, and a large number of transverse threads of flexible, electrically nonconductive material interconnecting the conductive threads and secured thereto by small plastics masses where they cross the same. The threads may be monofilaments, or spun or twisted.

The preferred construction uses conductive threads consisting of or containing metallic filaments and transverse threads consisting of twine formed from a synthetic resin, for example polyethylene.

One particular form of conductive thread which is very useful in the netting according to the invention comprises several strands twisted together, each strand consisting of a number of filaments, at least one of said filaments being a metallic conductor and at least one being nonmetallic so twisted together that the metallic conductor lies exposed on the surface of the strand at intervals determined by the amount of twist imparted to the strand. This conductive thread is light, and netting formed from lengths of this thread and transverse threads of polyethylene twine is of outstanding lightness.

An outstanding advantage of netting manufactured in this way is that the form of the netting is very precise and is not subject to distortion after the manner of conventional netting. It can transported and erected with a minimum of labor since it is light and can e carried on light posts. Moreover, owing to its greatly reduced tendency to distort and the reduced tendency to tangle, it need not be rolled but can be quickly and neatly folded and unfolded.

Examples of netting, processes and apparatus according to the invention will now be described with reference to the accompanying drawings in which:

FIG. 1 is a general schematic diagram of net-making apparatus according to the invention;

FIG. 2 is an enlarged perspective view of a thread crossing in netting as shown in FIG. 1.

FIG. 3 is a more detailed isometric view of an open die assembly in the apparatus shown in FIG. 1;

FIG. 4 is a diagrammatic isometric view illustrating the formation of a bond between crossing strands within a closed die assembly; and FIG. 5 is a diagrammatic vertical section through a portion of the apparatus in the region of the die assembles, showing the injection mechanism.

FIGS. 6 & 7 are a side elevation and plan view respectively of an alternative form of lower die.

FIGS. 8A and B are cross sections at different points of the channel portions of the die shown in FIG. 6.

As shown in FIG. 1 of the drawings, feed spools 10 for the longitudinal threads 11 are disposed at one end of the apparatus, the threads being drawn off intermittently in the direction of the arrow by takeup mechanism for the finished net at the opposite end of the apparatus.

The longitudinal threads 11 pass through die assemblies 13 where they are crossed by a transverse thread 14 drawn off a feed spool 15. The die assemblies are arranged to apply to the crossings of the threads small masses 16 of plastics material which bond the crossing threads together. A cutter 17 is provided to sever the transverse thread from the material remaining on the spool 15. The severed end of the material on the feed spool may be recovered by hand and drawn through the die assemblies to provide the next succeeding transverse thread. Alternatively, drawing mechanism (not shown) may be employed. Hot wire or other cutters 18 and 19 are also provided for final trimming of the transverse threads.

The form of netting shown in FIG. 1 is suitable for use in the construction of sheep fencing. For this purpose the transverse strands may be threads of polyethylene twine and the longitudinal strands or threads of polyethylene twine which incorporate a conductive wire or wires by virtue of which an erected fence can be electrified. The widely spaced transverse threads 21 extend the whole width of the netting and are trimmed by the cutters 18. The more closely spaced transverse threads 22 extend only half the width of the netting and are trimmed by the cutters 19.

The construction of a thread crossing is shown in FIG. 2 with the threads 11 and 21 secured together at their intersections by small masses 20 of a resin such as polyethylene. The conductive threads 11 each consist of a current conductor formed by twisting together three strands 53 each of which contain one metal filament 54 and five polyethylene filaments 55. This arrangement ensures that the metal filaments appear frequently at the surface of the thread, affording ample opportunity for contact with an animal through which the animal can receive a mild electrical shock.

The small mass 20 of resin may have the form of a sphere or other central mass surrounding the intersection of threads 11 and 21 with additional portions 56 extending in a cruciform arrangement The masses 20 can be applied by a process of injection molding, as described in detail hereinafter, and by the use of multiple molding assemblies a number of masses can be formed simultaneously. For example, if a head is employed which covers the area 57 of the netting, shown in a broken line in FIG. 1 twenty intersections can e secured in one operation.

In netting arranged as shown in FIG. 1 only every other transverse thread 21 extends the full width of the netting, the remaining threads 22 extending only halfway Where conductive transverse threads in such netting are spaced at about one foot, the netting can be employed for retaining sheep and lambs, being erected with the short threads 22 at the bottom. The narrow spacing then serves to retain the lambs, while the wider spacing above suffices to retain the sheep, and a 25 percent saving in polyethylene twine is achieved as compared with the use of an equal number of transverse threads 22 all of which extend the full width. For most purposes, however, all the transverse threads extend the full width of the netting.

Since the individual conductive threads 11 are insulated from one another, all or any one of combination of them may be electrified as desired when the netting is erected as a fence. Thus the lowest may not be electrified at all, in order to eliminate losses due to earthing of the conductor, or may be electrified from a separate generator in order that earthing of the lowermost thread or threads should not affect the operation of the remainder of the netting.

As an alternative and particularly advantageous arrangement is to employ the lowermost conductive thread as an earth wire and to connect the earth terminal of the electrical pulse generator to this thread, the remainder of the threads being connected together to the live terminal. Short lengths of conductive thread fitted with metal eyelets may be secured at intervals to the lowermost thread and the ground spikes of the fencing posts employed can then be passed through the eyelets before insertion into the ground. The lowermost thread is thereby securely held down and at the same time effectively earthed. It has been found that this arrangement of electrified fencing yields an unusually effective impulse at the upper conductive threads.

One form of die assembly is shown in FIG. 3 and includes an upper die 23 and a lower die 24. The upper die is formed with a cavity including a channel portion 25 of semicircular section and a central approximately hemispherical portion 26. A conical recess 27 receives the conical nozzle of the injector to be described later, and leads to the inlet port through which injected material enters the die cavity.

The lower die 24 also has a die cavity including a channel portion 28 and an approximately hemispherical portion 29. The channel 28 in the lower die is disposed at right angles to the channel portion 25 in the upper die.

The upper die 23 carries four adjustable guides 31 which capture and laterally locate the threads as the dies are closed together. The lower die 24 carries four guides 32 for locating the threads and also carries four adjustable jaws 33 which engage the guides 31 on the upper die to grip and compress the threads tightly and prevent egress of plastic material during the molding operation. The vertical location of the threads within the die cavity is determined by the adjustment of the jaws 33 and the guides 31.

It is preferable that the threads should be deflected from a straight path within the cavity, since this confers additional strength on the resulting bond. This can be achieved, as shown in FIG. 4, by ensuring that a thread 34, which enters and leaves the cavity at a relatively high level, crosses beneath a thread 35, which enters and leaves at a lower level.

An alternative preferred form of die is illustrated by the lower die shown in FIGS. 6 and 7. The die includes a cylindrical block 61 in which is formed a central cavity 62 and two opposite open channel portions 63. The other part of the total cavity is formed in the cooperating upper die (not shown). The channel portions 63 are wider and shallower nearer the center of the die (FIG. 8A) than near the edge (FIG. 8B), and the wider, shallow portion is adapted to engage the emerging thread tightly to seal the die. The die is preferably water-cooled, and in such a case, slight leakage of plastics material into the channel portions 63 does not progress far before the plastics material is hardened. Round the periphery of the lower die are tapered recesses which do not perform any gripping function but merely serve to locate and lead the threads.

The injection mechanism shown in FIG. 5 includes an injector barrel 36 surrounded by an electrical band heater 37 which can be controlled to give a steady desired working temperature. The working temperature varies with the plastics employed, and can be found by experiment. For high density polyethylene used to bond high density polyethylene threads, the preferred temperature lies within the range of 200°–250° C. A conical nozzle 38 cooperates with the recess 27 on the upper die 23. Granular plastics material is fed into the barrel from a granule hopper 40 by the operation of a plunger 41.

The plunger and the dies may be operated by any convenient mechanism. Thus, for example, the plunger may be connected for operation by an air cylinder 42, the upper die 23 may be loosely supported or "floating," and the lower 24 may be supported on the rod of the piston of a second air cylinder 43. This mechanism can be repeated for each die assembly across the width of the apparatus, but for the sake of simplicity is only shown once in FIG. 5. Operation of the air cylinders 42 and 43 can be under automatic control, which for the production of the netting shown in FIG. 1 may determine that certain of the injectors and die assemblies are not actuated in every cycle of operation.

As an alternative to the drawing of the transverse tread through the dies, as shown in FIG. 1, it is preferred for fast working that the transverse thread should be drawn across the longitudinal threads in front of the dies while molding of the previously drawn transverse thread proceeds in the dies. When the dies open and the formed netting is advanced, the transverse thread is drawn laterally into the die assemblies. Once again, the transverse thread may be drawn by hand, but a gripping shackle (not shown) may be employed to take the free end of the thread material from the spool, and to draw the transverse thread, the thread being then gripped by two arms, one at each end, and the arms moved to introduce the transverse thread into the dies when they open.

The preferred cycle of operation is thus as follows. With the longitudinal threads 11 and transverse thread 14 in position in the die assemblies, the dies 23 and 24 in each assembly are closed by the lower cylinders 43. Simultaneously, the transverse thread may be parted from the feed spool 15. Actuation of the upper cylinders 42 effects injection of molding material, pressure being maintained on the plungers 41 until the die cavities are full, whereafter the motion of the cylinders 42 is reversed. In the meantime, a further length of transverse thread material is drawn across in front of the dies, in preparation for the next molding cycle. The dies are opened by returning the lower cylinders 43 and the longitudinal threads 11 are advanced one step, a further length of transverse thread 14 being simultaneously drawn laterally into the die assemblies. Operation of the cutters 18 and 19 can be arranged to occur at any convenient point in the cycle when the longitudinal threads are stationary.

The embodiments of the invention in which an exclusive property or privilege is claimed are defined as follows:

1. A method of producing elongated rectangular netting having a plurality of parallel and elongated longitudinal threads extending continuously throughout the length of the netting and fixedly interconnected by a plurality of transverse cross threads, comprising the steps of:
  a. providing a supply of flexible threads each containing thermoplastic material;
  b. drawing a first plurality of such threads in the longitudinal direction thereof in space parallel and substantially coplanar relationship through a molding head containing a plurality of aligned open molding dies, each thread passing continuously through one of said dies;
  c. drawing at least one further such thread in the longitudinal direction thereof transversely across said first threads substantially perpendicular thereto and through said molding head until an elongated portion of said further thread extends through said plurality of aligned dies, said further thread being movable through said dies independently of said first threads;
  d. closing said dies;
  e. admitting to said dies a thermoplastic material at a temperature at which said material is in a fluid or plastic condition, and forming small molded masses of said plastic material respectively enclosing each crossing of said further thread with each of said first threads and forming a welded bond between said plastic material and the thermoplastic material of said threads whereby said threads are fixedly and integrally interconnected through said masses;
  f. opening said plurality of aligned dies;
  g. severing said elongated portion of said further thread from the supply thereof;
  h. advancing said first threads with said elongated portion of said further thread fixedly connected thereto in a direction longitudinally of said first threads and transversely of said elongated portion of said further thread until said elongated portion of said further thread is spaced laterally from and substantially parallel to said plurality of aligned dies; and
  i. cyclically repeating steps b to h to continuously produce thereby an elongated length of rectangular netting in which said first threads individually continuously extend longitudinally throughout said length and said portions of said further thread extend perpendicular to the longitudinal direction.

2. A method according to claim 1, wherein each of said first threads comprises a plurality of strands twisted together.

3. A method according to claim 2, wherein each of said strands includes a plurality of individual filaments, at least some of said filaments being of plastic material.